No. 754,459. PATENTED MAR. 15, 1904.
A. C. KLOMAN.
RETORT FOR MAKING GAS AND COKE.
APPLICATION FILED MAY 29, 1900.
NO MODEL. 2 SHEETS—SHEET 1.

WITNESSES
INVENTOR
A. C. Kloman
by Bakewell & Bakewell
his Attorneys.

No. 754,459. PATENTED MAR. 15, 1904.
A. C. KLOMAN.
RETORT FOR MAKING GAS AND COKE.
APPLICATION FILED MAY 29, 1900.
NO MODEL. 2 SHEETS—SHEET 2.
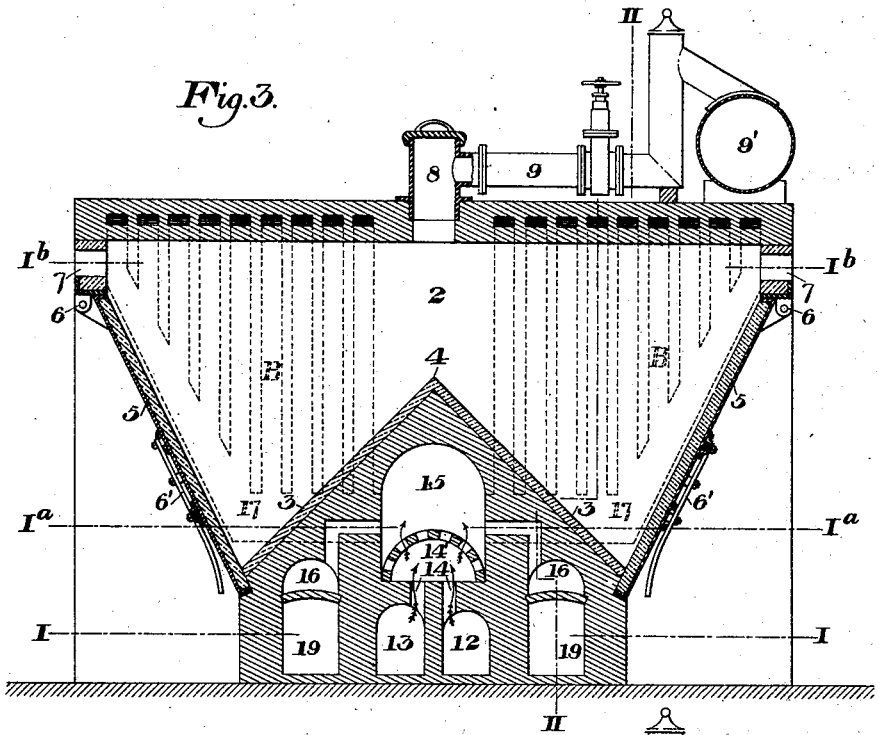
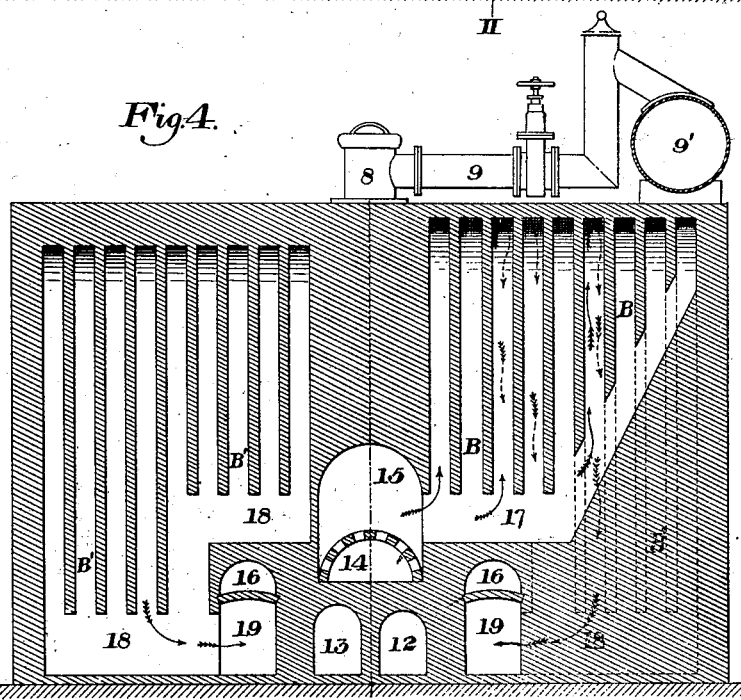
WITNESSES
Warren W. Swartz
INVENTOR
A. C. Kloman
by Bakewell & Bakewell
his Attorneys.

No. 754,459.

Patented March 15, 1904.

UNITED STATES PATENT OFFICE.

ANTHONY C. KLOMAN, OF PITTSBURG, PENNSYLVANIA, ASSIGNOR OF ONE-HALF TO JAMES SCOTT, OF PITTSBURG, PENNSYLVANIA.

RETORT FOR MAKING GAS AND COKE.

SPECIFICATION forming part of Letters Patent No. 754,459, dated March 15, 1904.

Application filed May 29, 1900. Serial No. 18,357. (No model.)

*To all whom it may concern:*

Be it known that I, ANTHONY C. KLOMAN, of Pittsburg, Allegheny county, Pennsylvania, have invented a new and useful Improvement in Retorts for Making Gas and Coke, of which the following is a full, clear, and exact description, reference being had to the accompanying drawings, forming part of this specification, in which—

Figure 1:
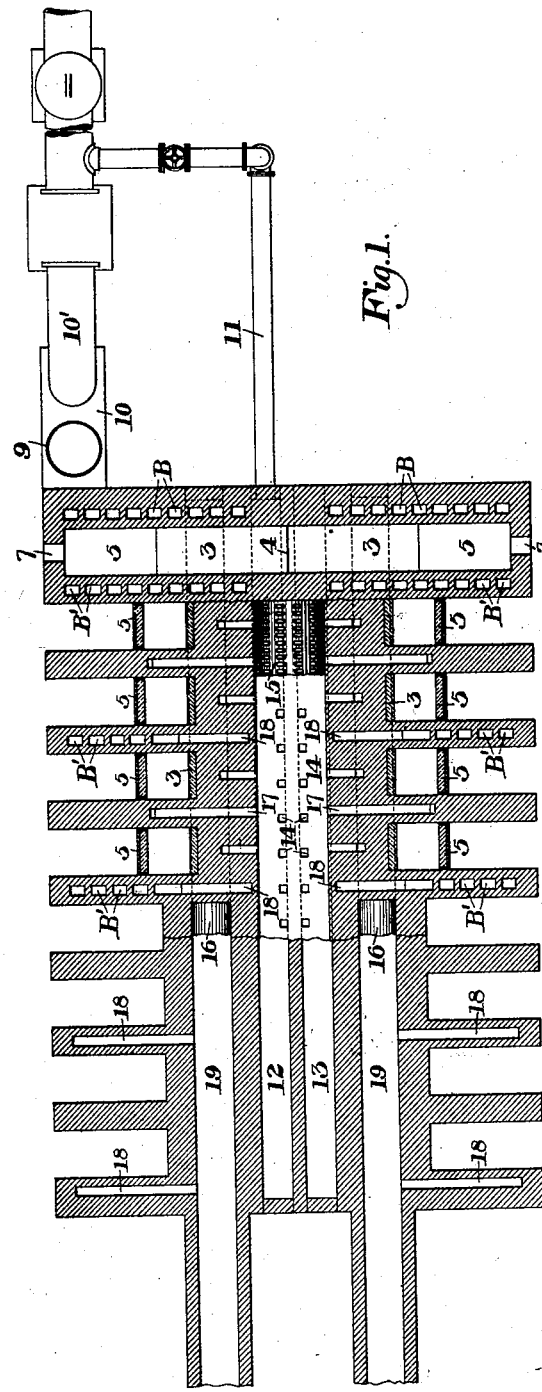
Figure 2:
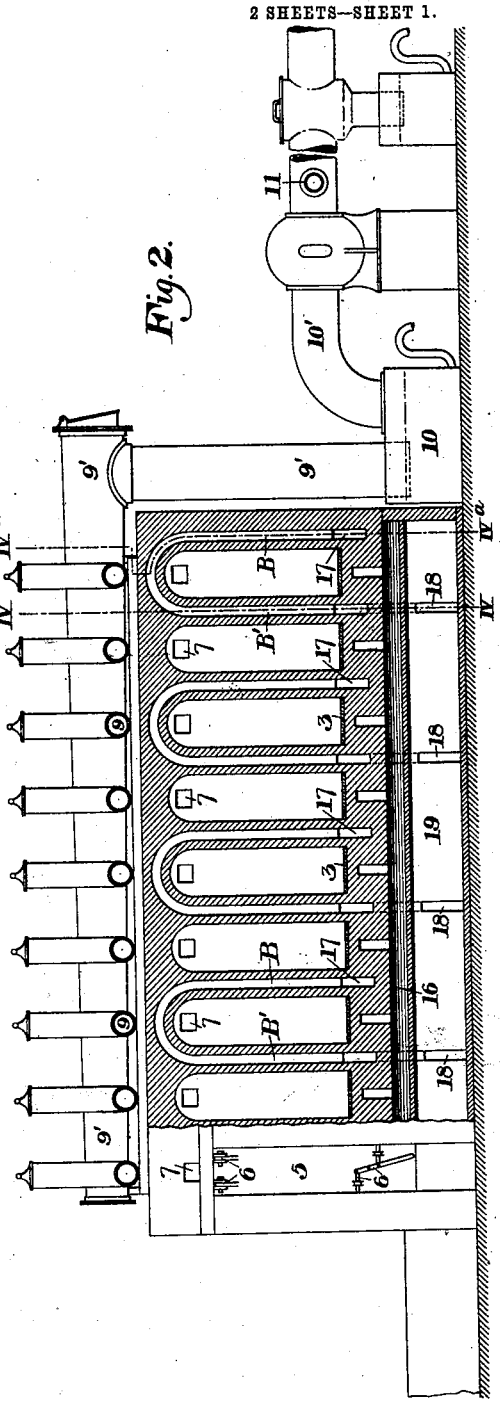

Figure 1 is an irregular horizontal section of my improved apparatus, the section planes being on the lines I I, $I^a I^a$, and $I^b I^b$ of Fig. 3. Fig. 2 is a side elevation, partly in section, on the line II II of Fig. 3. Fig. 3 is a vertical cross-section on the line III III of Fig. 2. Fig. 4 is an irregular vertical section, the section plane of the left-hand figure being on the line IV IV, and the section plane at the right hand of the figure being on the line $IV^a$ $IV^a$ of Fig. 2.

The apparatus which I have invented comprises a series of retort-chambers 2 2, extending crosswise of the structure and each having a sloping bottom 3, preferably inclined in both directions from a central angular ridge 4. The discharge end or ends of the chambers extend to a level above that of the ridge and are provided with doors 5, hinged at 6 and provided with fastening devices 6', so that they may be held in the closed position shown in Fig. 3, but that when unfastened the doors will swing open and will permit the automatic discharge of the coked contents of the retort, the extension of the top or tops of the discharge opening or openings to a level above that of the angular ridge facilitating the discharge of the coke. At the ends of the retort-chambers are openings 7 7, Fig. 2, through which the coal introduced through the charging-opening 8, Fig. 4, may be distributed and leveled.

9 is the gas-eduction pipe, one of which leads from each of the retort-chambers and connects with the gas-main 9', which discharges into a washer 10, from which the gas leads through a pipe 10'. The several retort-chambers are heated by gas, which may be taken in whole or in part from the pipe 10' through a branch pipe 11, discharging into the gas-flue 12, which extends along the producer structure beneath the retort-chambers and transversely thereto, preferably parallel with an air-flue 13, and at intervals these flues 12 and 13 communicate through ports 14 with the lower part 14' of a combustion-chamber 15, which extends parallel with the flues 12 13 beneath the bottom of the retort-chambers and preferably derives an additional supply of air from air-flues 16. The combustion of gas within the chamber 15 heats the inclined floor of the retort-chambers 3, and in order to heat the walls thereof I form in the walls a series of flues B B', which are of arched form to correspond with the shape of the walls and communicate at one end, B, with cross-flues 17, leading from the combustion-chamber, as shown in Fig. 3 and at the right side of Fig. 4, and at the other end, B', communicate with cross-flues 18, leading to one of the other of the chimney-flues 19, which are arranged in proximity to the air-flues 16. The construction is such that the hot products of combustion and flame from the combustion-chamber 15 pass up through the branches B of the flues in the walls of the retort-chambers, thence across the arches of the said chambers and down through the branches B' to the chimney-flues 19, through which they pass to the stack, heating the air in the flue 16 in their passage. In this way heat is brought very intimately into contact with the bottom and side walls of the retort-chambers and the coal contained therein is heated and distilled, giving off its gases through the pipes 9. When the coal has been completely distilled, the doors 5 are unfastened and swing open on their pivots, permitting the coked contents of the chambers to discharge. This inclination of the bottom is of great importance, as it facilitates the discharge of the contents of the chambers, and thus makes the operation of the retorts quicker and less laborious.

Within the scope of my invention as defined in the broader claims the floor of each retort-chamber may be formed with only a single slope instead of the double slope, as shown.

The arrangement of the flues is well adapted to secure the most efficient heating of the chambers.

I claim—

1. A coke-retort chamber having means for applying heat thereto, said chamber having a bottom inclined in both directions from a middle angular ridge and discharge-openings at the ends of said inclined bottoms, the tops of said openings extending to a level above the ridge, and doors closing said discharge-openings; substantially as described.

2. A coke-retort chamber having means for applying heat thereto, said chamber having a bottom inclined in both directions from a middle angular ridge and discharge-openings at the ends of said inclined bottoms, the tops of said openings extending to a level above the ridge, doors closing said openings, and a combustion-chamber extending beneath said inclined bottoms; substantially as described.

3. The combination of a series of retort-chambers, a common combustion-chamber extending below the chambers transversely of the same, and arched flues in the walls, said flues extending over the chambers and communicating at one end with the combustion-chamber, and at the other end with the stack-flue; substantially as described.

4. The combination of a series of gas-retort chambers having inclined bottoms, a common combustion-chamber extending transversely of the retort-chambers beneath the bottom thereof, and arched flues in the walls, said flues extending over the retort-chambers and being connected at one end with the combustion-chamber, and at the other end with a stack-flue; substantially as described.

5. A series of coke-retort chambers located side by side and adjacent to each other, each chamber having an inclined bottom and a door at the base, means for applying heat to all of said retort-chambers from a common source, and gas-eduction pipes leading from their tops to the gas-main; substantially as described.

6. A series of coke-retort chambers located side by side and adjacent to each other, each chamber having a bottom inclined in both directions from a middle angular ridge, doors at the bases of the inclines, gas-eduction pipes leading from the eduction-chamber to the gas-main, and means for heating the bottoms and sides of all of said retorts; substantially as described.

In testimony whereof I have hereunto set my hand.

A. C. KLOMAN.

Witnesses:
 THOMAS W. BAKEWELL,
 H. M. CORWIN.